(12) United States Patent
Moldave et al.

(10) Patent No.: US 10,987,873 B2
(45) Date of Patent: Apr. 27, 2021

(54) TECHNIQUES FOR MIXING IN ADDITIVE FABRICATION AND RELATED SYSTEMS AND METHODS

(71) Applicant: Formlabs, Inc., Somerville, MA (US)

(72) Inventors: Jack Moldave, Lincoln, MA (US); Sarah Bennedsen, Somerville, MA (US); Christian Reed, Chelsea, MA (US); Konstantinos Oikonomopoulos, Boston, MA (US); Robert Joachim, Brookline, MA (US); Geoff Hill, Boston, MA (US); Maxim Lobovsky, Cambridge, MA (US)

(73) Assignee: Formlabs, Inc., Somerville, MA (US)

( * ) Notice: Subject to any disclaimer, the term of this patent is extended or adjusted under 35 U.S.C. 154(b) by 0 days.

(21) Appl. No.: 16/817,522

(22) Filed: Mar. 12, 2020

(65) Prior Publication Data

US 2020/0316869 A1 Oct. 8, 2020

Related U.S. Application Data

(60) Provisional application No. 62/818,963, filed on Mar. 15, 2019.

(51) Int. Cl.
*B29C 64/106* (2017.01)
*B29C 64/393* (2017.01)
(Continued)

(52) U.S. Cl.
CPC ........ *B29C 64/393* (2017.08); *B01F 13/0818* (2013.01); *B01F 15/00201* (2013.01);
(Continued)

(58) Field of Classification Search
None
See application file for complete search history.

(56) References Cited

U.S. PATENT DOCUMENTS

2007/0074659 A1  4/2007 Wahlstrom
2017/0057177 A1  3/2017 Ferguson et al.
(Continued)

FOREIGN PATENT DOCUMENTS

KR  2017-0003103 U  9/2017

OTHER PUBLICATIONS

International Search Report and Written Opinion in connection with International Application No. PCT/US2020/022411, dated Aug. 24, 2020.

(Continued)

*Primary Examiner* — Mark A Osele
*Assistant Examiner* — Evan T Hulting
(74) *Attorney, Agent, or Firm* — Wolf, Greenfield & Sacks, P.C.

(57) ABSTRACT

According to some aspects, a mixer for detection and/or removal of material in an undesired location of an additive fabrication device is provided. For instance, in an inverse stereolithography device, liquid photopolymer may adhere and cure or partially cure to a surface of the additive fabrication device in a location that may interfere with the additive fabrication process and/or cause the additive fabrication process to be unsuccessful. The mixer may be coupled to a movable structure within the additive fabrication device so that the mixer, when coupled to the movable structure, may be moved along at least one axis within the additive fabrication device. The mixer may be configured to detect and/or remove undesired material from a surface within the additive fabrication device.

20 Claims, 10 Drawing Sheets

(51) Int. Cl.
  *B33Y 30/00* (2015.01)
  *B33Y 50/02* (2015.01)
  *B29C 64/314* (2017.01)
  *B29C 64/135* (2017.01)
  *B01F 13/08* (2006.01)
  *B01F 15/00* (2006.01)

(52) U.S. Cl.
  CPC .......... *B29C 64/135* (2017.08); *B29C 64/314* (2017.08); *B33Y 30/00* (2014.12); *B33Y 50/02* (2014.12); *B01F 2215/0049* (2013.01)

(56) References Cited

U.S. PATENT DOCUMENTS

2017/0057178 A1   3/2017   Frantzdale et al.
2017/0182708 A1   6/2017   Lin et al.
2018/0370080 A1*  12/2018  McCarthy ............... B29C 33/40

OTHER PUBLICATIONS

Invitation to Pay Additional Fees for International Application No. PCT/US2020/022411, dated Jul. 2, 2020.
PCT/US2020/022411, Aug. 24, 2020, International Search Report and Written Opinion.

* cited by examiner

TECHNIQUES FOR MIXING IN ADDITIVE FABRICATION AND RELATED SYSTEMS AND METHODS

CROSS REFERENCE TO RELATED APPLICATIONS

The present application claims the benefit under 35 U.S.C. § 119(e) of U.S. Provisional Patent Application Ser. No. 62/818,963, filed Mar. 15, 2019, entitled "Techniques For Mixing In Additive Fabrication And Related Systems And Methods," which is hereby incorporated herein by reference in its entirety.

BACKGROUND

Additive fabrication, e.g., 3-dimensional (3D) printing, provides techniques for fabricating objects, typically by causing portions of a building material to solidify at specific locations. Additive fabrication techniques may include stereolithography, selective or fused deposition modeling, direct composite manufacturing, laminated object manufacturing, selective phase area deposition, multi-phase jet solidification, ballistic particle manufacturing, particle deposition, laser sintering or combinations thereof.

Many additive fabrication techniques build parts by forming successive layers, which are typically cross-sections of the desired object. Typically each layer is formed such that it adheres to either a previously formed layer or a substrate upon which the object is built. In one approach to additive fabrication, known as stereolithography, solid objects are created by successively forming thin layers of a curable polymer resin, typically first onto a substrate and then one on top of another. Exposure to actinic radiation such as light cures a thin layer of liquid resin, which causes it to harden and adhere to previously cured layers and the bottom surface of the substrate.

SUMMARY

According to some aspects, an additive fabrication device configured to form layers of solid material on a build platform is provided. The additive fabrication device comprises: a container; a mixer disposed within the container and configured to move along at least a first axis; a sensor configured to produce sensor data indicative of a state of the mixer; at least one processor; and at least one computer readable medium comprising instructions. The instructions, when executed by the at least one processor, operate one or more actuators to move the mixer along the first axis; and detect a failure of an additive fabrication process based at least in part on the sensor data produced by the sensor during movement of the mixer along the first axis.

According to some aspects, an additive fabrication device configured to form layers of solid material on a build platform is provided. The additive fabrication device comprises: a build platform; a mixer disposed below the build platform and configured to move along a first axis; at least one sensor configured to produce sensor data indicative of a state of the mixer; at least one processor; and at least one computer readable medium comprising instructions. The instructions, when executed by the at least one processor, lower the build platform iteratively whilst operating one or more actuators to move the mixer along the first axis underneath the build platform until the build platform contacts the mixer; and detect a failure of an additive fabrication process based at least in part on the sensor data produced by the sensor during movement of the mixer along the first axis.

According to some aspects, an additive fabrication device configured to form layers of solid material on a build surface by directing light onto a liquid photopolymer is provided. The additive fabrication device comprises: a container configured to hold liquid photopolymer; a mixer disposed within the container and comprising a first magnetic component; and a movable structure disposed below the container and configured to move along at least one axis, wherein the movable structure comprises a second magnetic coupling component configured to couple to the first magnetic component, and wherein motion of the moveable structure along the at least one axis causes motion of the mixer along the at least one axis as a result of said coupling.

According to some aspects, an additive fabrication device configured to form layers of solid material on a build platform is provided. The additive fabrication device comprises: a container; a mixer disposed within the container and comprising a first magnetic component; a movable structure disposed below the container and configured to move along a first axis, wherein the movable structure comprises a second magnetic component configured to couple to the first magnetic component; a sensor configured to produce sensor data indicative of a state of the mixer; at least one processor; and at least one computer readable medium comprising instructions. The instructions, when executed by the at least one processor, operate one or more actuators to move the movable structure and the mixer along the first axis whilst the first and second magnetic components are coupled; and detect a failure of an additive fabrication process based at least in part on the sensor data produced by the sensor during movement of the mixer along the first axis.

According to some aspects, an additive fabrication device configured to form layers of solid material on a build platform is provided. The additive fabrication device comprises: a build platform; a mixer disposed below the build platform and comprising at least one magnetic component; a movable structure disposed below the mixer and configured to move along a first axis, wherein the movable structure comprises a second magnetic component configured to couple to the first magnetic component; a sensor configured to produce sensor data indicative of a state of the mixer; at least one processor; and at least one computer readable medium comprising instructions. The instructions, when executed by the at least one processor: lower the build platform iteratively whilst moving the movable structure along the first axis underneath the build platform whilst the first and second magnetic components are coupled until the build platform contacts the mixer; detect a failure of an additive fabrication process based at least in part on sensor data produced by the sensor; and move the movable structure along the first axis while the build platform is in contact with the mixer to remove the detected failure.

The foregoing apparatus and method embodiments may be implemented with any suitable combination of aspects, features, and acts described above or in further detail below. These and other aspects, embodiments, and features of the present teachings can be more fully understood from the following description in conjunction with the accompanying drawings.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

DETAILED DESCRIPTION

Figure 1A:
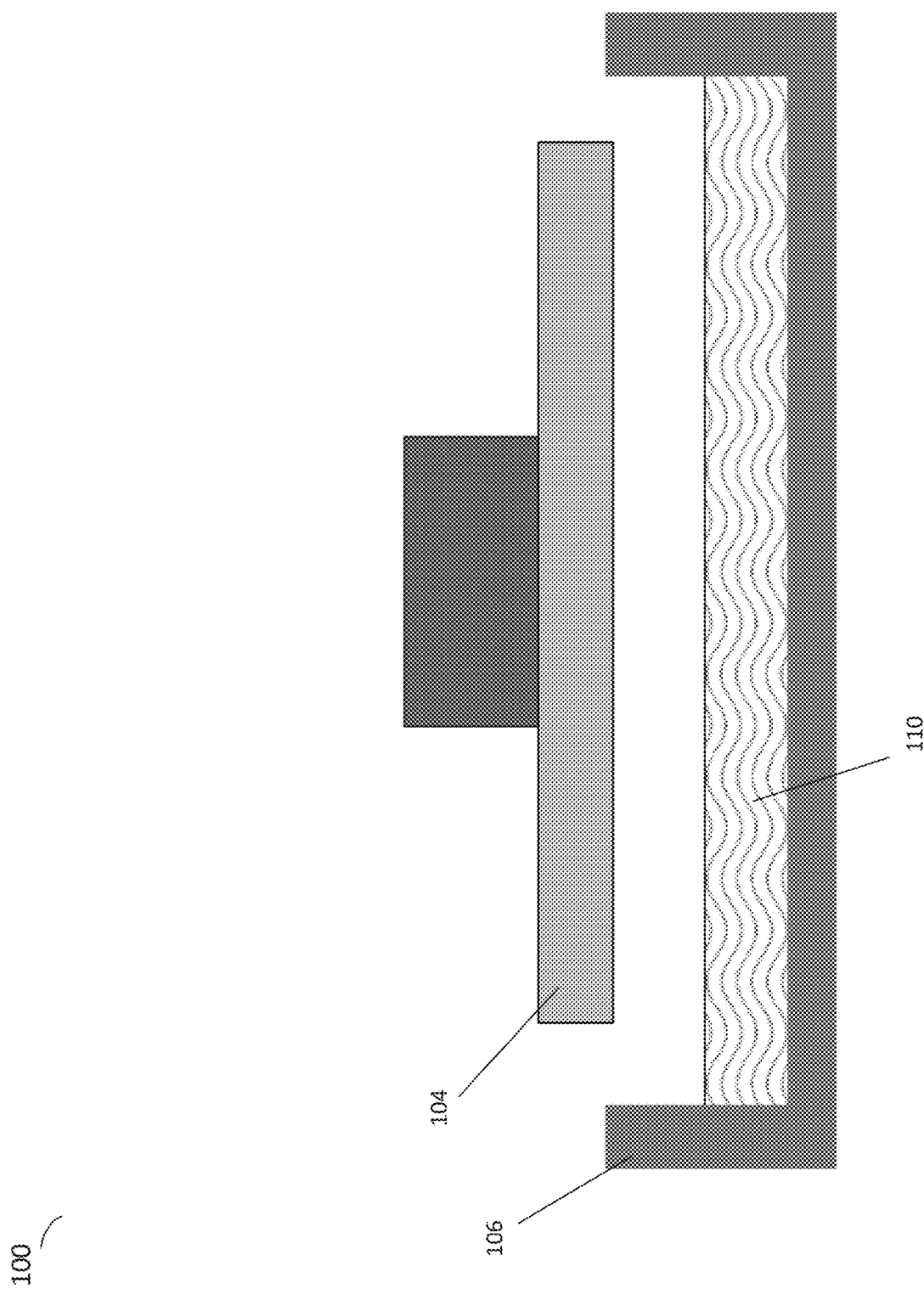
FIGS. 1A-1B illustrate a schematic view of a stereolithographic additive fabrication device that forms a plurality of layers of a part, according to some embodiments.

As discussed above, some additive fabrication techniques may form solid objects by forming successive thin layers on a build platform. In stereolithography, such layers are formed from a liquid photopolymer, such as a photopolymer resin. Actinic radiation (radiation that initiates and/or develops the curing process) such as light may be directed to a selected portion of the photopolymer resin, thereby curing it to a solid (or semi-solid) layer in a desired shape.

Some stereolithographic devices may form solid material in contact with a surface additional to previous layers of the part or the build platform, such as a container in which liquid photopolymer is held. Actinic radiation may be introduced through the bottom of a liquid photopolymer container or to a top surface of the liquid photopolymer. The first type of stereolithographic device is sometimes referred to as an "inverted stereolithography" or "constrained surface stereolithography" device, but the techniques discussed herein may also be applied to the second type of stereolithographic device.

In some instances of operating an inverted stereolithography device, the cured photopolymer or portions of the cured photopolymer may remain adhered to the container surface or build platform during or after an additive fabrication process. This adhered, cured photopolymer may interfere with the current or a subsequent additive fabrication process by blocking or scattering light or preventing the formation of a flat layer of solid material, potentially distorting or destroying the part or damaging the additive fabrication device. In a non-inverted stereolithography device, such debris may remain floating on top of the liquid photopolymer rather than remaining adhered to a surface. Automatically detecting and addressing such debris in the container, on the build platform, or in the liquid photopolymer may improve both the quality of the fabricated parts and the user experience.

The inventors have recognized and appreciated techniques for magnetically coupling a mixer to an additive fabrication device wherein the mixer is configured to remove cured photopolymer or other debris from the surface of the container and/or the build platform. In some cases, the mixer may be used to detect various calibration or print failures in an additive fabrication device. Taken individually or in any suitable combination, these improvements mitigate at least one of the above-described challenges, as will be described in further detail below.

Conventional additive fabrication devices may have a mixer affixed to one or more actuators configured to move the mixer. For instance, the mixer may be mechanically attached to an actuator that moves the mixer within a container such that when the actuator moves, the mixer also moves as a result of its coupling to the actuator. The inventors have recognized and appreciated that it may be desirable to couple a mixer to a movable structure such that the mixer may be easily engaged and disengaged from the movable structure. For example, in some modes of additive fabrication, it may be desirable to move the movable structure without also moving the mixer. Accordingly, the inventors have developed systems for removably coupling a mixer to a movable structure within an additive fabrication device. In some embodiments, such removable coupling between the mixer and the movable structure may be accomplished by any suitable mechanical coupling means (e.g., any suitable locking mechanisms, latches, ball and socket joints, touch and/or push latches, and/or actuated latches).

The inventors have further recognized and appreciated, however, that using magnetic coupling to removably couple the mixer and movable structure may reduce the mechanical complexity of the additive fabrication device or may contain any components in contact with the liquid photopolymer within the container, thereby limiting user interaction with components contacting liquid photopolymer. In some cases, the movable structure may be configured to engage and disengage the magnetic coupling to the mixer, such as by moving one or more magnets toward or away from the mixer, by activating or deactivating an electromagnet, etc. This configuration enables the mixer to be moved with the movable stage only when desired. In some configurations the mixer may always be engaged.

In some embodiments, the movable structure may comprise an optical unit which houses optical components configured to cure liquid photopolymer during an additive fabrication process. By removably coupling the mixer to a movable structure such as an optical unit, fewer actuators may be required within the additive fabrication device, decreasing opportunities for mechanical failure during use.

In some embodiments, coupling between the mixer and the movable structure may be achieved through magnetic components housed in the mixer and the movable structure. It may be further appreciated that magnetic coupling may decrease the complexity of installation and maintenance of the mixer within the additive fabrication device, as the container may be easily removed and installed, limiting user contact with the liquid photopolymer. This may improve the overall user experience as well as reduce the chance of a user damaging the additive fabrication device when installing or removing the container.

Another problem that may arise in stereolithographic additive fabrication devices is that cured photopolymer or other debris may contaminate the liquid photopolymer or otherwise be situated in a such a way that subsequent fabrication will be impaired. Debris may interfere with an additive fabrication process by, for example, blocking or scattering light within the photopolymer resin, or by adhering to the build platform or part being formed and preventing uniform layers from being formed, distorting the part. In extreme cases, material attached to a build platform, such as debris or previously formed parts, may cause damage to a container if not detected and removed prior to forming a new layer or part. In some embodiments, a mixer may include a filter configured to catch and remove unwanted debris from the liquid photopolymer. The liquid photopolymer may flow over the top surface of the mixer and then down through the filter as the mixer is moved through the liquid photopolymer, thereby removing debris from the liquid photopolymer.

Following below are more detailed descriptions of various concepts related to, and embodiments of, techniques for magnetically coupling a mixer to an additive fabrication device. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

Although particular systems and methods have been described and shown herein, it is envisioned that the functionality of the various methods, systems, apparatus, objects, and computer readable media disclosed herein may be applied to any now known or hereafter devised additive fabrication technique wherein it is desired to detect and remove failures of an additive fabrication process.

Figure 1B:
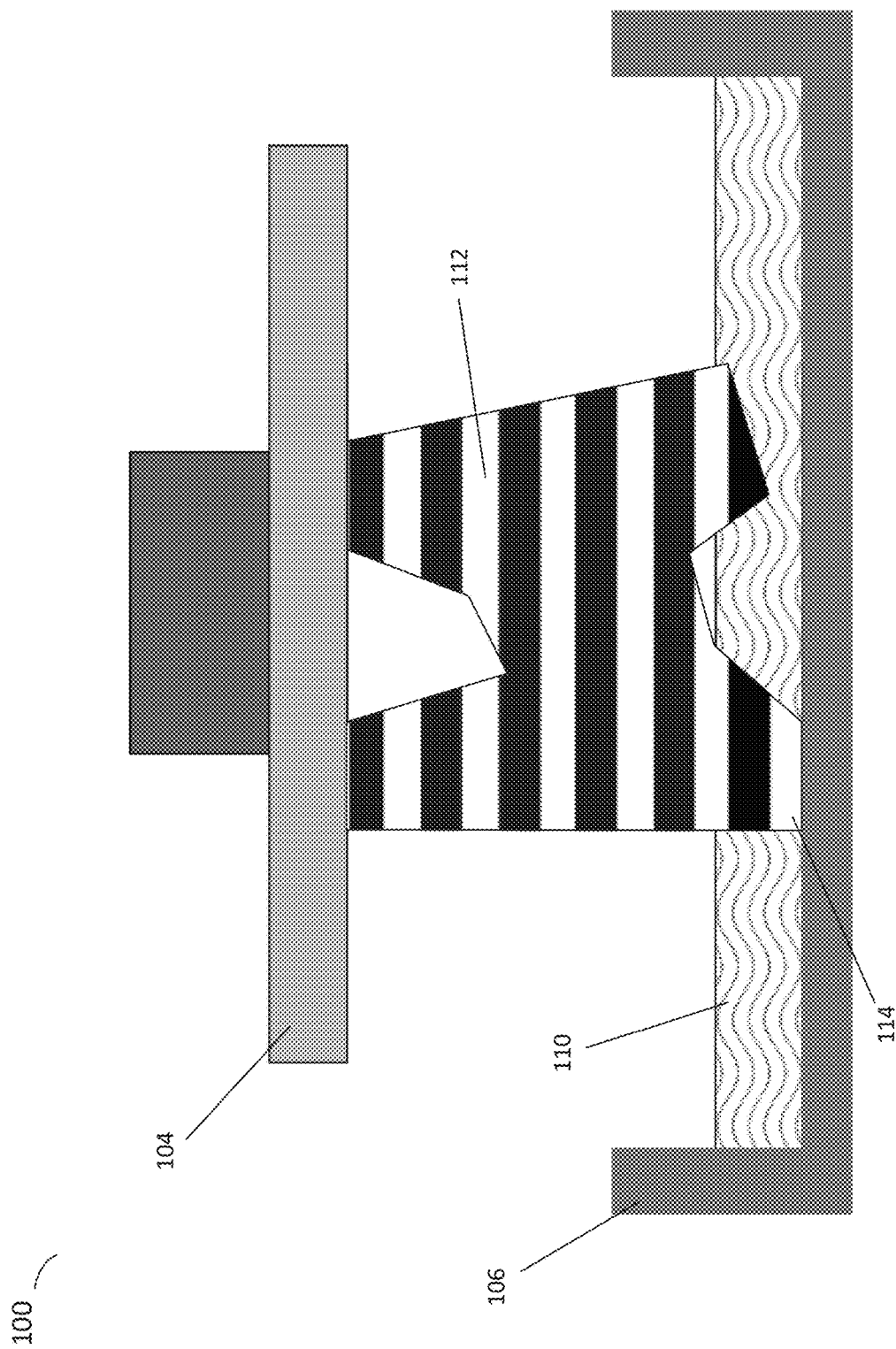

To illustrate one exemplary additive fabrication technique, an inverse stereolithographic printer is depicted in FIGS. 1A-B. Exemplary stereolithographic printer 100 forms a part in a downward facing direction on a build platform such that layers of the part are formed in contact with a surface of a container in addition to a previously cured layer or the build platform. In the example of FIGS. 1A-B, stereolithographic printer 100 comprises build platform 104, container 106, and liquid photopolymer 110. A downward facing build surface 104 opposes the bottom surface of container 106, which is filled with a liquid photopolymer 110. The bottom surface of container 106 may be formed of any suitable material including a hard, inflexible material or a flexible film. The structures and methods described herein may be realized in any type of container. FIG. 1A represents a configuration of stereolithographic printer 100 prior to formation of any layers of a part on build surface 104.

As shown in FIG. 1B, a part 112 may be formed layer-wise, with the initial layer attached to the build platform 104. The container's floor may be transparent to actinic radiation such as light, which can be targeted at portions of the thin layer of liquid photocurable resin resting on the floor of the container. Exposure to actinic radiation such as light cures a thin layer of the liquid resin, which causes it to harden. The layer 114 is at least partially in contact with both a previously formed layer and the surface of the container 106 when it is formed. The top side of the cured resin layer typically bonds to either the bottom surface of the build surface 104 or with the previously cured resin layer in addition to the transparent floor of the container. In order to form additional layers of the part subsequent to the formation of layer 114, any bonding that occurs between the transparent floor of the container and the layer must be broken. For example, one or more portions of the surface (or the entire surface) of layer 114 may adhere to the container such that the adhesion must be removed prior to formation of a subsequent layer.

Figure 2:
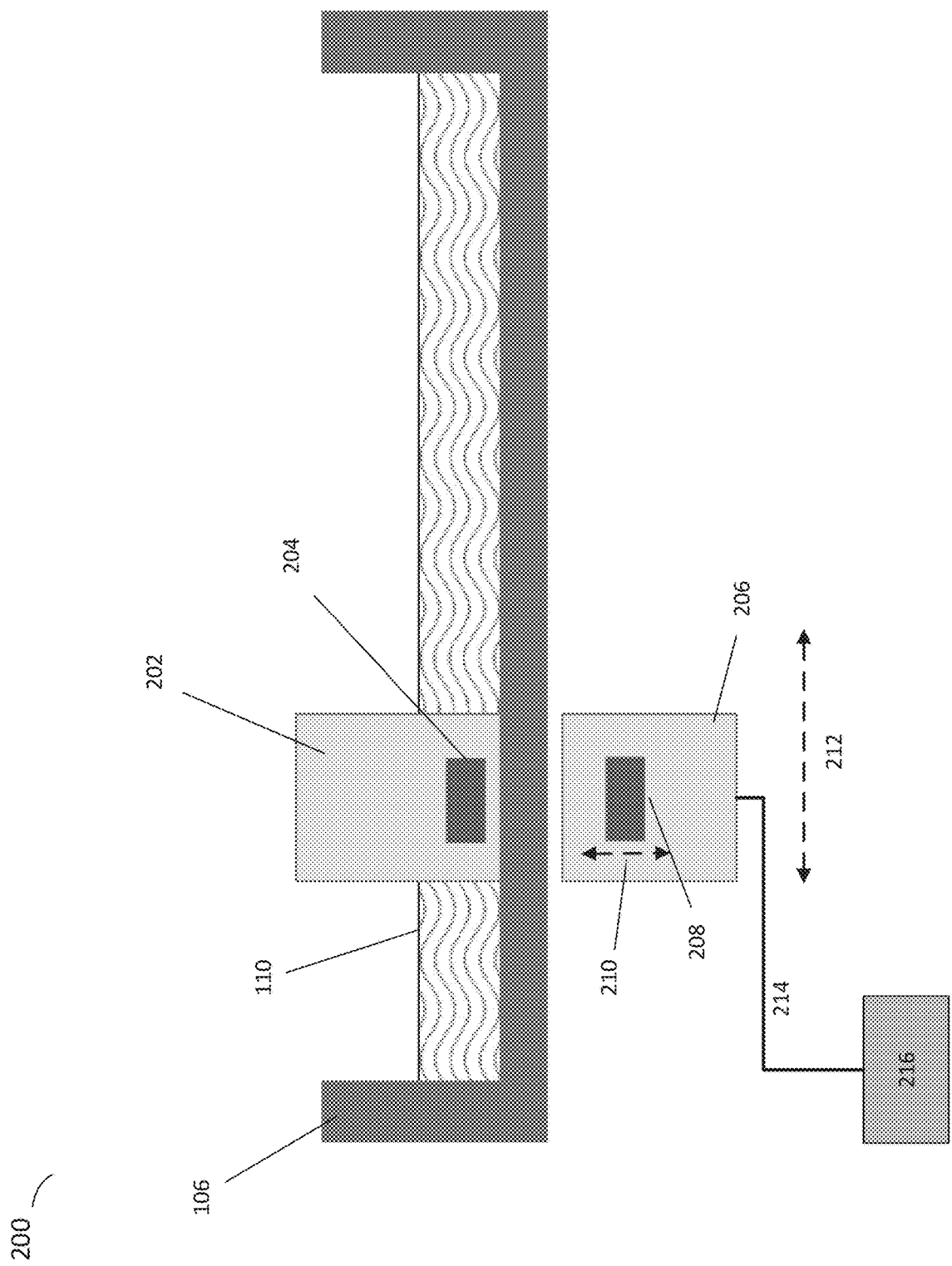
FIG. 2 illustrates a schematic view of an additive fabrication device having a mixer and movable structure, according to some embodiments.

An exemplary additive fabrication device comprising a mixer and a movable structure is shown in FIG. 2. According to some embodiments, additive fabrication device 200 may comprise a container 106 which is configured to hold liquid photopolymer 110. Mixer 202 is disposed within container 106, and comprises a magnetic component 204 for coupling to a magnetic component 208 of a movable structure 206 which may be disposed below container 106. In some embodiments, movable structure 206 may be disposed next to container 106 or above container 106.

In the example of FIG. 2, one or more magnetic components 208 may be raised and lowered along axis 210 in order to couple and decouple, respectively, with one or more magnetic components magnetic component 204 of the mixer 202. In some embodiments, the magnetic component(s) 208 may be mechanically coupled to one or more arms arranged within the movable structure 206 that are configured to raise and lower the magnetic component(s) along axis 210. The movable structure 206 may be configured to move along axis 212, and when magnetically coupled to the mixer 202, may also move the mixer 202 along axis 212. When the mixer 202 is not magnetically coupled to the movable stage 206, motion of the movable stage 206 along axis 212 may not cause motion of the mixer. In some embodiments, movable structure 206 is configured to move along axis 212 through mechanical coupling to one or more actuators.

Additive fabrication device 200 may further comprise an optional sensor 216 configured to monitor mixer 202 through link 214. Link 214 may comprise any suitable wired and/or wireless communications connection. According to some embodiments, sensor 216 may be at least one Hall Effect sensor configured to detect when the magnetic component 208 is raised or lowered and whether the mixer 202 is coupled to the movable structure 206. Sensor 216 may further be able to detect minor displacement of mixer 202 away from movable structure 206 in addition to detecting an unexpected decoupling of mixer 202 and movable structure 206. Such detection may allow the user to determine when the container or build platform may need additional passes of the mixer or additional user intervention steps to remove debris such as cured liquid photopolymer 110. In some embodiments, such as where additive fabrication device 200 does not comprise a sensor 216, the user may be prompted to confirm that mixer 202 is in position prior to an additive fabrication process.

"Decoupling," as used herein, refers to unexpected disengagement between mixer 202 and movable structure 206 due to an outside force. The outside force may be caused by the mixer encountering cured photopolymer or other debris adhered to the build platform 104 or the bottom of the container 106. If the cured photopolymer or other debris is adhered strongly to the build platform 104 or the bottom of the container 106, the mixer 202 may not be able to overcome the adhesion to remove the cured photopolymer or other debris. Additionally, the outside force causing decoupling may be due to the liquid photopolymer 110. Liquid photopolymer 110 may be a viscous liquid which may resist the movement of the mixer 202. Decoupling may occur due to the liquid photopolymer 110 if the magnetic coupling between magnetic components 204 and 208 is not strong enough to overcome the force of the liquid photopolymer 110 or if the mixer 202 is moved too quickly through the liquid photopolymer 110.

The magnetic coupling force may be any suitable strength which prevents decoupling while the mixer 202 is moved through the liquid photopolymer 110 and allows the mixer 202 to move at a reasonable speed. In some embodiments, the magnetic coupling force may enable the removal of debris. The magnetic coupling force may enable the removal of small debris in a single pass of the mixer 202 or the removal of medium debris in multiple passes of the mixer 202. In other embodiments, the magnetic coupling force may not enable the removal of debris, but rather allows the mixer 202 to decouple from the movable structure 206 upon encountering debris of any size so that the additive fabrication device may alert the user of a failure.

The desirable coupling force may depend on a variety of factors including, but not limited to, the viscosity of liquid photopolymer 110, the speed at which the mixer 202 is intended to move, and/or the expected strength of adherence for some typical or "model" debris. These factors may differ between different materials and/or additive fabrication devices. In some embodiments, the magnetic coupling force between magnetic components 204 and 208 may be higher than 5 N. In some embodiments where the viscosity of the liquid photopolymer 110 or the speed at which the mixer 202 is intended to move are lower, the magnetic coupling force may ideally be between 5 and 15 N and the speed of the mixer 202 may be between 30 and 100 mm/s. Where the viscosity of the liquid photopolymer 110 and/or the speed at which the mixer 202 is intended to move is higher, the magnetic coupling force may ideally be between 10 and 25 N and the speed of the mixer 202 may be between 80 and 180 mm/s. A magnetic coupling force higher than 25 N may also be implemented depending on factors such as, but not limited to, the viscosity of liquid photopolymer 110, the speed at which the mixer 202 is intended to move, and/or the expected strength of adherence for some typical or "model" debris.

According to some embodiments, sensor 216 may be, or may comprise, a force sensor configured to monitor forces applied to mixer 202 whilst being moved by movable structure 206. Sensor 216 may be configured to detect decoupling of mixer 202 from movable structure 206 as well as smaller fluctuations in coupling that mixer 202 encounters as it is moved by movable structure 206. Sensor 216 may additionally or alternatively be configured to trigger a stop of the mixing process if a force is sensed above a threshold force to prevent damage to the additive fabrication device 200.

According to some embodiments, movement of the mixer 202 along axis 212 may serve to remove debris, described herein as fabrication failures, from the lower surface of the container 106 or the surface of the build platform 104. Fabrication failures can occur in numerous ways during the fabrication process, or even prior to the fabrication process, if unexpected behavior occurs. Such behavior often includes the presence of material in an undesired location, which can cause the fabrication process to proceed in a manner other than the intended manner. For instance, the presence of solid material, such as a previously formed part, on the build platform 104 prior to fabrication may cause a failure because the additive fabrication device is configured to form material on the build platform under the assumption that the build platform is a flat surface at a specific location in the additive fabrication device. In some embodiments wherein the bottom surface of the container 106 is formed of a flexible film, adhered debris or a previously formed part on the build platform 104 may cause the build platform 104 to puncture the film as the build platform 104 is lowered to be proximate to the film.

As another example, cured or partially-cured photopolymer may adhere to a part being fabricated or some other surface during fabrication and thereby cause additional material to be cured in an undesired location. Collectively, such issues may be termed "failures" herein, although it will be appreciated that the production of unexpected behavior may not immediately cause the additive fabrication device itself to fail and in some cases, may not even cause the device to fail at all. In some cases, for example, a "failure" may reduce the quality of the fabricated part but may otherwise not impede the fabrication process.

Movement of the mixer 202 along axis 212 may also serve to mix the liquid photopolymer 110. "Mixing" of the liquid photopolymer 110, as used herein, refers to the redistribution of liquid photopolymer 110 within the container 106. Rather, mixing, as used herein, indicates the homogenization of the liquid photopolymer. For example, some liquid photopolymers may contain components that may settle or compact over time. Such components may include composite or particulate filler components such as ceramic, glass, or wax. Some liquid photopolymers may have dyes or pigments that may settle leading to inconsistent coloring or poor resin quality. Mixing may redistribute the liquid photopolymer in such a way as to homogenize the viscosity and/or composition of the liquid photopolymer. Mixing prior to an additive fabrication process may improve the consistency of the additive fabrication process, as the liquid photopolymer will respond to light in a similar manner throughout its volume if its properties are homogenous.

In some embodiments the mixer 202 may be configured to include a process of recoating in which the liquid photopolymer is moved to hasten the natural motion that occurs as the liquid flows and ensure an even layer of liquid photopolymer is prepared for the printing process. Since the liquid may be viscous, recoating may provide improvements in the form of a quicker print process and/or a more uniform printing layer.

Figure 3:
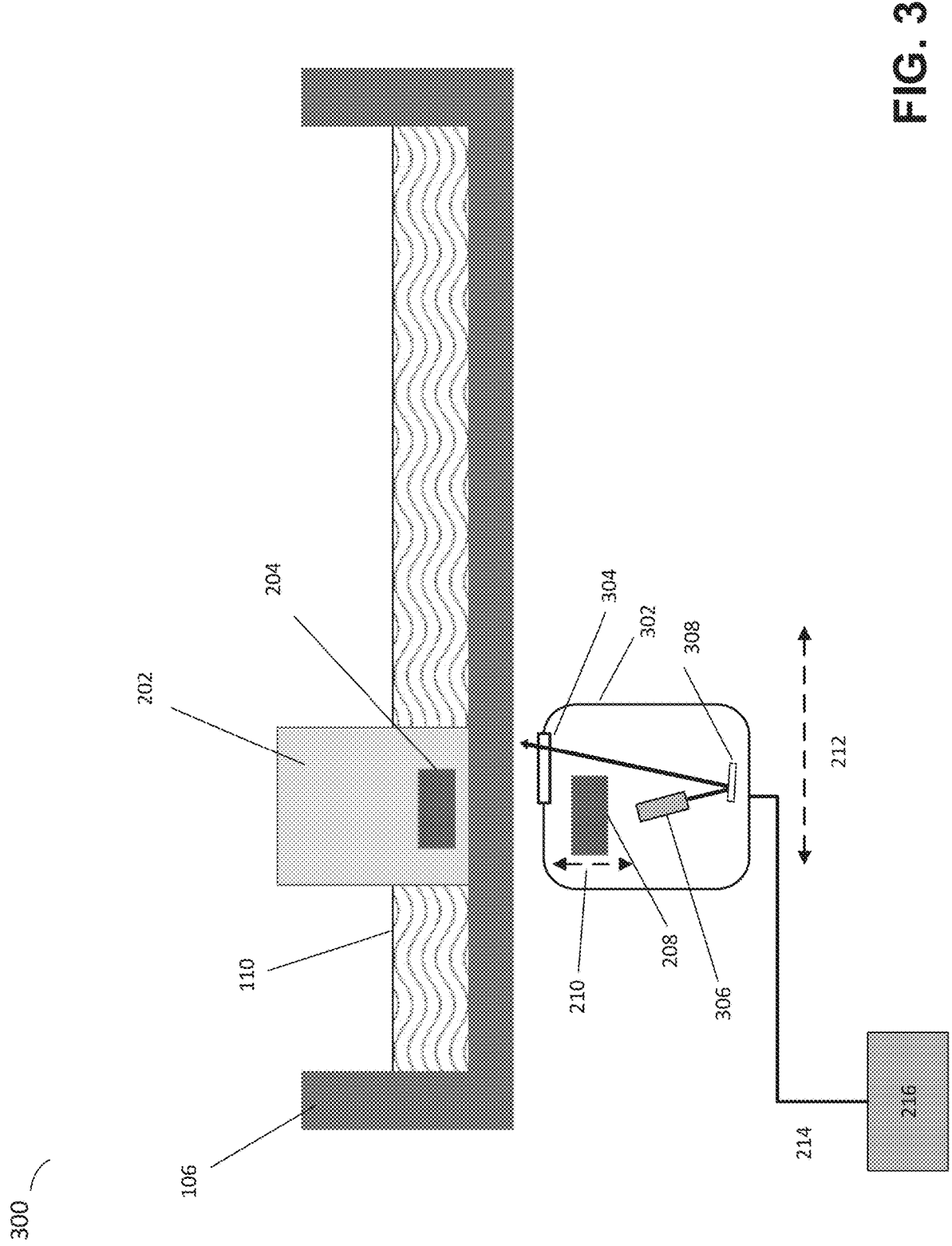
FIG. 3 illustrates a schematic view of an additive fabrication device having a mixer and movable structure comprising an optical module, according to some embodiments.

FIG. 3 depicts an exemplary embodiment of an additive fabrication device 300 wherein the movable structure comprises an optical unit 302. Optical unit 302 may be used to direct actinic radiation such as light onto the liquid photopolymer 110 in order to perform a stereolithographic additive fabrication process as described previously. Optical unit 302 may be further configured to move along two or more axes, as described in U.S. application Ser. No. 16/163,403, which is incorporated herein by reference in full.

Optical unit 302 may serve two purposes within additive fabrication device 300, being configured to both move the mixer 202 prior to or during a fabrication process to address failures in the container 106 or on the build platform 104 as well as to decouple from the mixer and direct light onto the liquid photopolymer 110 to form a part 112 during an additive fabrication process. According to some embodiments, the multifunctionality of optical unit 302 may reduce the number of actuators needed within additive fabrication device 300, simplifying the device and reducing opportunities for mechanical failure.

Optical unit 302 may comprise such optical components as an optical window 304, which allows light or other radiation to exit the optical unit 302, a light source 306, and an optical component 308 configured to steer light from light source 306. Optical component 308 may be a mirror galvanometer. Optical unit 302 may further comprise additional optical components to assist in steering or focusing light from light source 306. These additional optical components may include, but are not limited to, mirrors, lenses, filters, galvanometers, or any combination thereof. In some embodiments, optical unit 302 may further comprise magnetic component 208 which may be raised and lowered along axis 210 in order to couple to and decouple from magnetic component 204 of mixer 202. Optical unit 302 may also move along axis 212. When optical unit 302 is coupled to mixer 202, optical unit 302 may move along axis 212, thereby moving mixer 202 along axis 212.

FIGS. 4A-4D illustrate various views of an illustrative mixer, according to some embodiments. Mixer 400 may be an illustrative implementation of, for example, mixer 202 shown in FIGS. 2 and 3. Mixer 400 may be formed of any suitable material configured to be chemically inert when in contact with the liquid photopolymer 110, including, but not limited to, metals, glass, or plastics such as PVDF, PEEK, or PVC. In the example of FIGS. 4A-4D, mixer 400 may comprise an edge 402 configured to extend along the width of mixer 400. Edge 402 may be further configured in any suitable way to scrape failures such as adhered, cured liquid photopolymer off of the bottom surface of a container, such as container 106. For example, edge 402 may be wedge-shaped (e.g., changing in thickness over its profile from a thin leading edge to a thick body portion) such that edge 402 may fit between the bottom surface of the container 106 and an adhered failure and separate the adhered failure from the bottom surface. In some embodiments, edge 402 may be formed of a flexible material including, but not limited to, flexible plastics, urethane, or rubbers.

Mixer 400 may further comprise an edge 404 extending along the width of mixer 400 which may be configured to recoat the bottom surface of container 106 with an even layer of liquid photopolymer 110. Edge 404 may be configured to extend proximate to, but not in contact with, the bottom surface of a container. Edge 404 may be disposed above the bottom surface of container 106 by a distance equal to or greater than the layer thickness to be formed during an additive fabrication process. Edge 404 may be disposed above the bottom surface of container 106 by a distance between or greater than 10 to 300 microns. Edge 404 may additionally be angled to improve wicking of liquid photopolymer 110 from outside edges of container 106 to the center of container 106. In the example of FIGS. 4A-4D, a filter 410 is disposed on the upper surface of the mixer 400. Filter 410 may be configured to catch cured photopolymer or other debris which are loose in the liquid photopolymer 110.

Magnet compartments 406 may be arranged in any suitable manner to enable coupling to the movable structure 206 or optical unit 302. In the exemplary embodiment of FIG. 4A, a magnet compartment 406 is disposed at both ends of the mixer 400. Extending off of the magnet compartments 406 are parking features 408. These parking features 408 may enable mixer 400 to be "parked" when not in use. That is, during an additive fabrication process, the movable structure 206 may couple to mixer 400 and move it to a pre-determined location wherein parking features 408 may engage with the additive fabrication device in such a way to keep mixer 400 stationary. The movable structure 206 may then decouple from mixer 400 and begin or continue an additive fabrication process while mixer 400 remains stationary and does not interfere with the additive fabrication process.

Figure 4A:
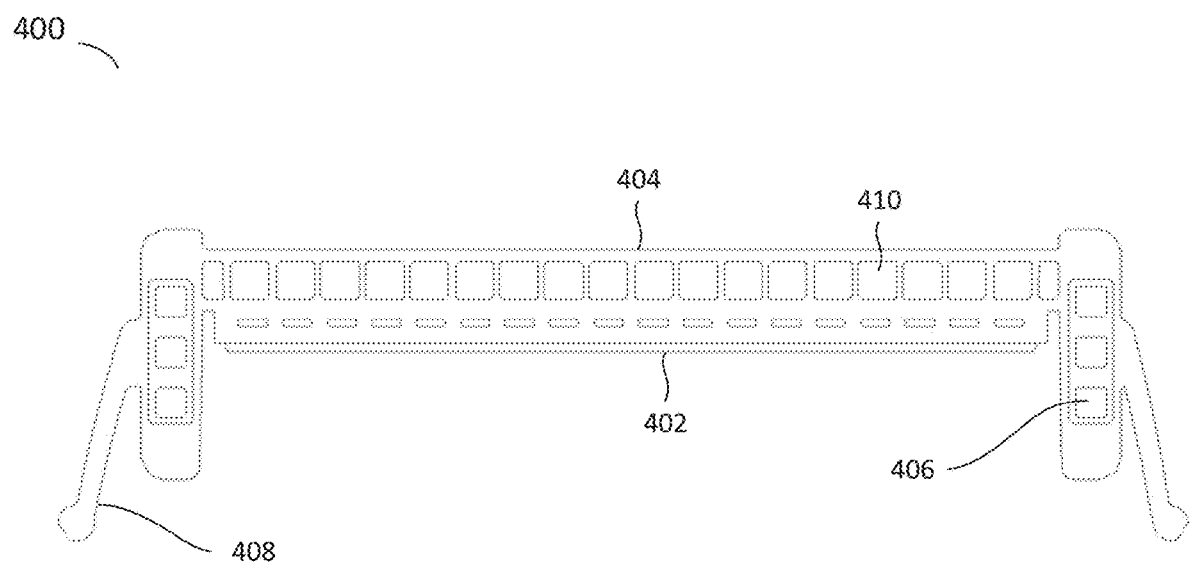
FIG. 4A illustrates a plan view of a mixer for an additive fabrication device, according to some embodiments.
Figure 4B:
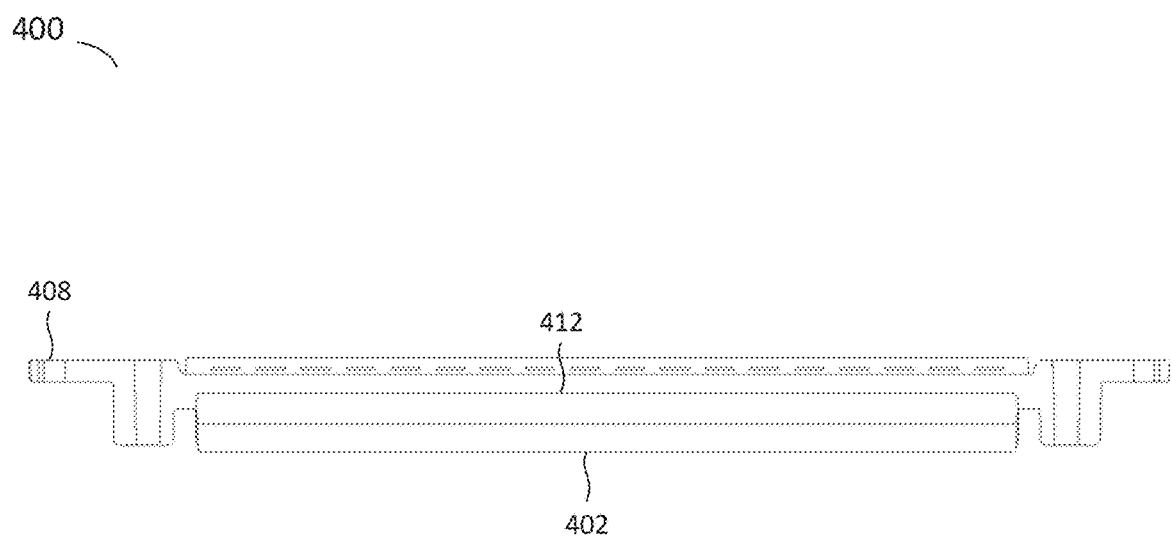
FIG. 4B illustrates an elevation view of a mixer for an additive fabrication device, according to some embodiments.

FIG. 4B illustrates an elevation view of mixer 400, according to some embodiments. Mixer 400 may further comprise edge 412, which is disposed along the upper surface of mixer 400 and extends along the width of mixer 400. Edge 412 may be configured in any suitable way to scrape failures such as adhered, cured liquid photopolymer off of the surface of build platform 104. For example, edge 412 may be wedge-shaped (e.g., changing in thickness over its profile from a thin leading edge to a thick body portion) such that edge 412 may fit between the build platform 104 and an adhered failure and separate the adhered failure from the build platform 104.

Figure 4C:
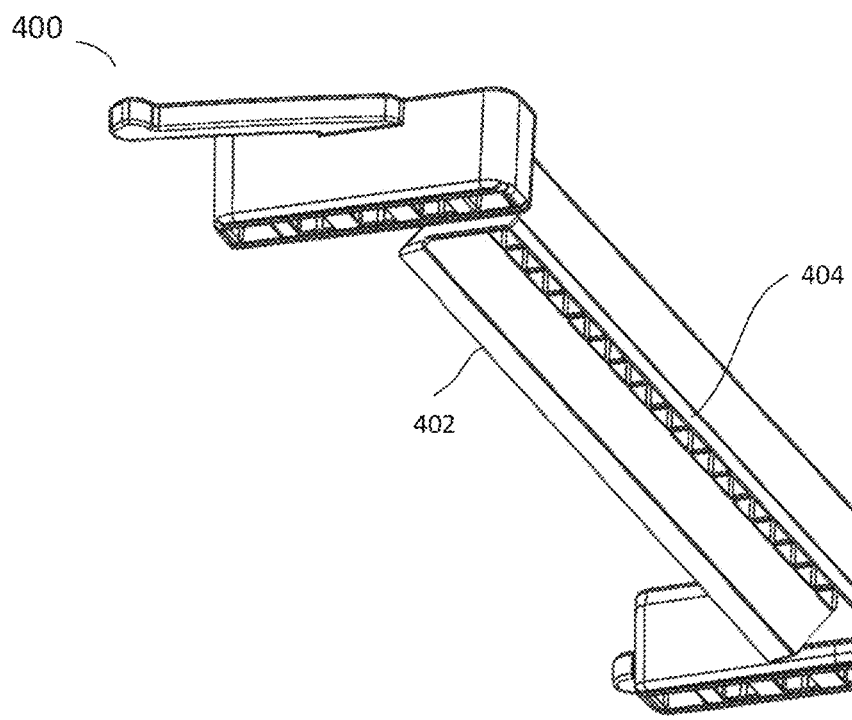
FIG. 4C illustrates a perspective view of a mixer for an additive fabrication device, according to some embodiments.
Figure 4D:
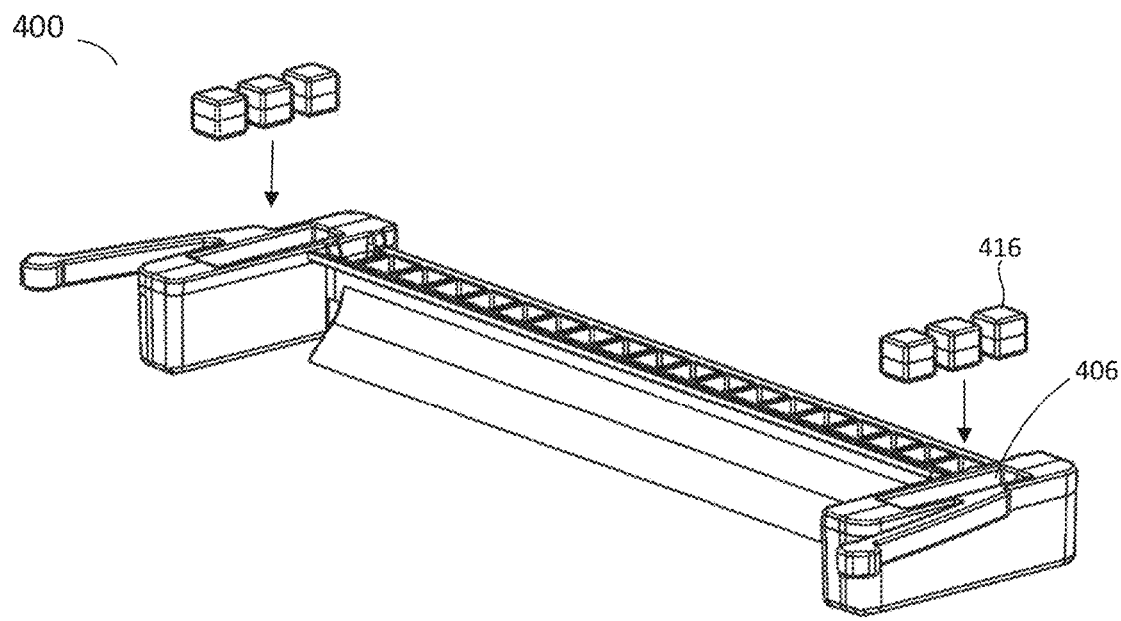
FIG. 4D illustrates a perspective view of a mixer and magnetic components for an additive fabrication device, according to some embodiments.

FIGS. 4C and 4D illustrate perspective views of mixer 400 from above and below mixer 400, according to some embodiments. Differences in the configurations of edges 402 and 404 may be seen in FIG. 4C, with edge 402 configured to scrape and remove failures from the bottom of container 106 while edge 404 is configured to distribute an even layer of liquid photopolymer as the mixer 400 is moved through the container 106. In some embodiments, mixer 400 may comprise only one of any of a selection of edges 402, 404, and/or 412. Mixer 400 may comprise any combination of edges 402, 404, and/or 412.

FIG. 4D illustrates a perspective view of mixer 400 from above and an exemplary configuration of magnets 416 which may be contained in magnet compartments 406, according to some embodiments. In the example of FIG. 4D, three magnets 416 are housed in each magnet compartment 406, but any suitable number of magnets may be used. In some embodiments, the force required for decoupling the magnetic components 204 and 208 may determine how much force the mixer may be able to apply to failures within the container 106 or on the build platform 104.

In some instances, it may be desirable to use multiple magnets arranged with alternating poles as shown in FIG. 4D in order to reduce the chance of decoupling between mixer 400 and movable structure 206 or to increase the force required to decouple magnetic components 204 and 208. Such an arrangement harnesses magnetic repulsion between same magnetic poles. As magnetic components 204 and 208 begin to slide past each other in a decoupling event, same magnetic poles (i.e. N-N and S-S pairs) in the magnetic components 204 and 208 become closer together, increasing the repulsion between them. This repulsion may help shift magnetic components 204 and 208 back to a fully coupled state.

Figure 5:
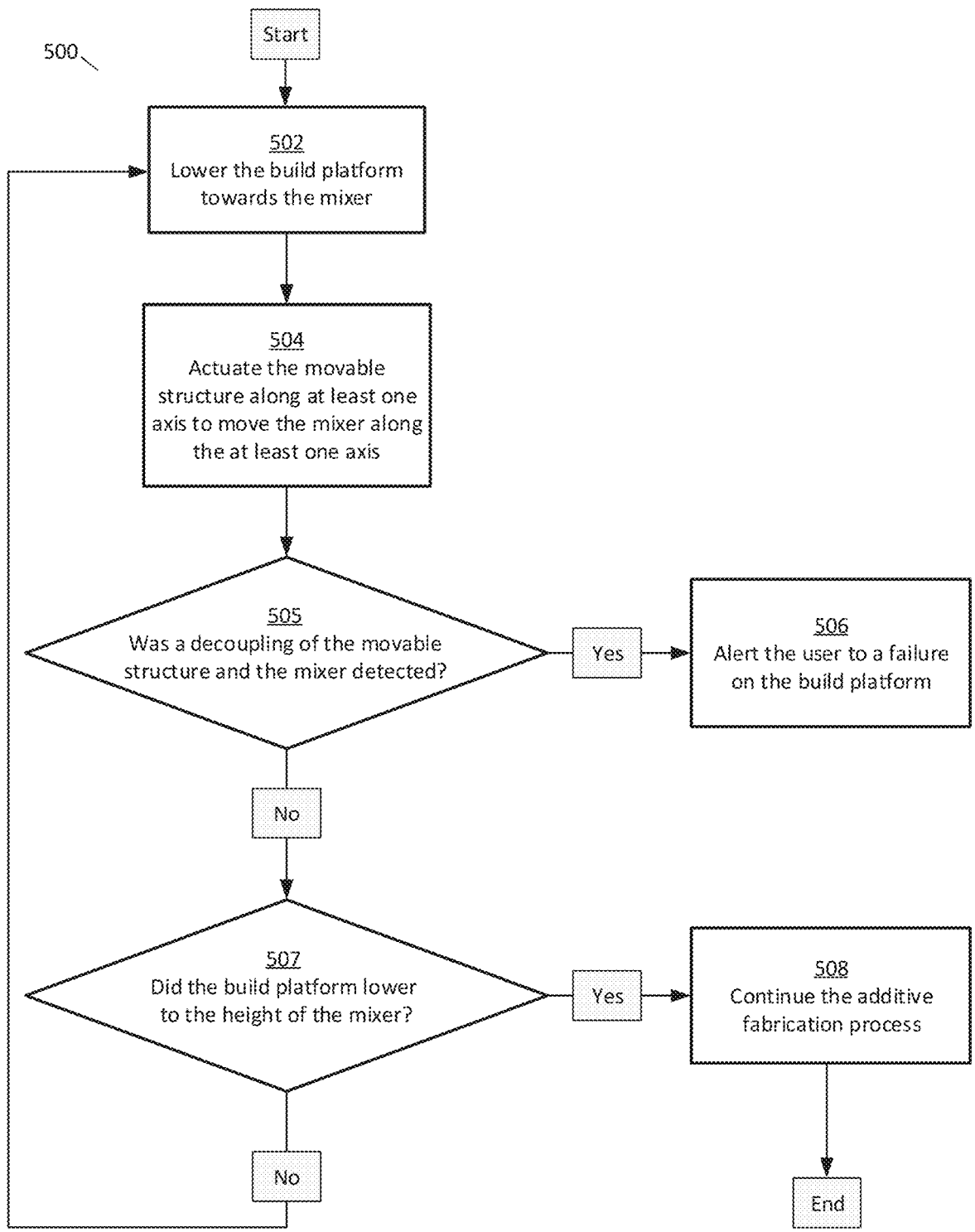
FIG. 5 is a flowchart of a process suitable for detecting and/or removing debris on a build platform of an additive fabrication device, according to some embodiments.

FIG. 5 is a flowchart of an exemplary process 500 for detecting and addressing failures on the build platform 104 of an additive fabrication device, according to some embodiments. Process 500 may also act to mix and/or filter the liquid photopolymer, that is, to homogenize the liquid photopolymer prior to an additive fabrication process. In act 502, the build platform 104 is lowered a step toward the mixer 202. In act 504, the movable structure 206, whilst being coupled to mixer 202, is actuated along at least one axis 212 in order to move the mixer 202 along the at least one axis 212 through container 106. If sensor 216 detects a decoupling of the mixer 202 from movable structure 206 in act 505, the additive fabrication device may alert the user to a failure on the build platform in act 506.

In some embodiments, rather than detecting a decoupling of mixer 202 from movable structure 206, sensor 216 may be configured to detect a force on the mixer. Sensor 216 may be further configured to monitor the path of the mixer 202 to then alert the user to fluctuations in forces experienced by the mixer 202 or in the movement of mixer 202. Such fluctuations could indicate anomalies in the liquid photopolymer 110 or failures which the mixer 202 cannot remove but do interfere with the motion of mixer 202.

If sensor 216 does not detect a decoupling of the mixer 202 from movable structure 206 in act 505, and the build platform has not reached a vertical position equal to the height of the mixer 202 as may be detected in act 507, the system returns to act 502 and moves the build platform 104 further. If, instead, the build platform had reached a vertical position equal to the height of the mixer 202, then the additive fabrication process may be continued in act 508, as no failures have been detected on the build platform 104.

Figure 6:
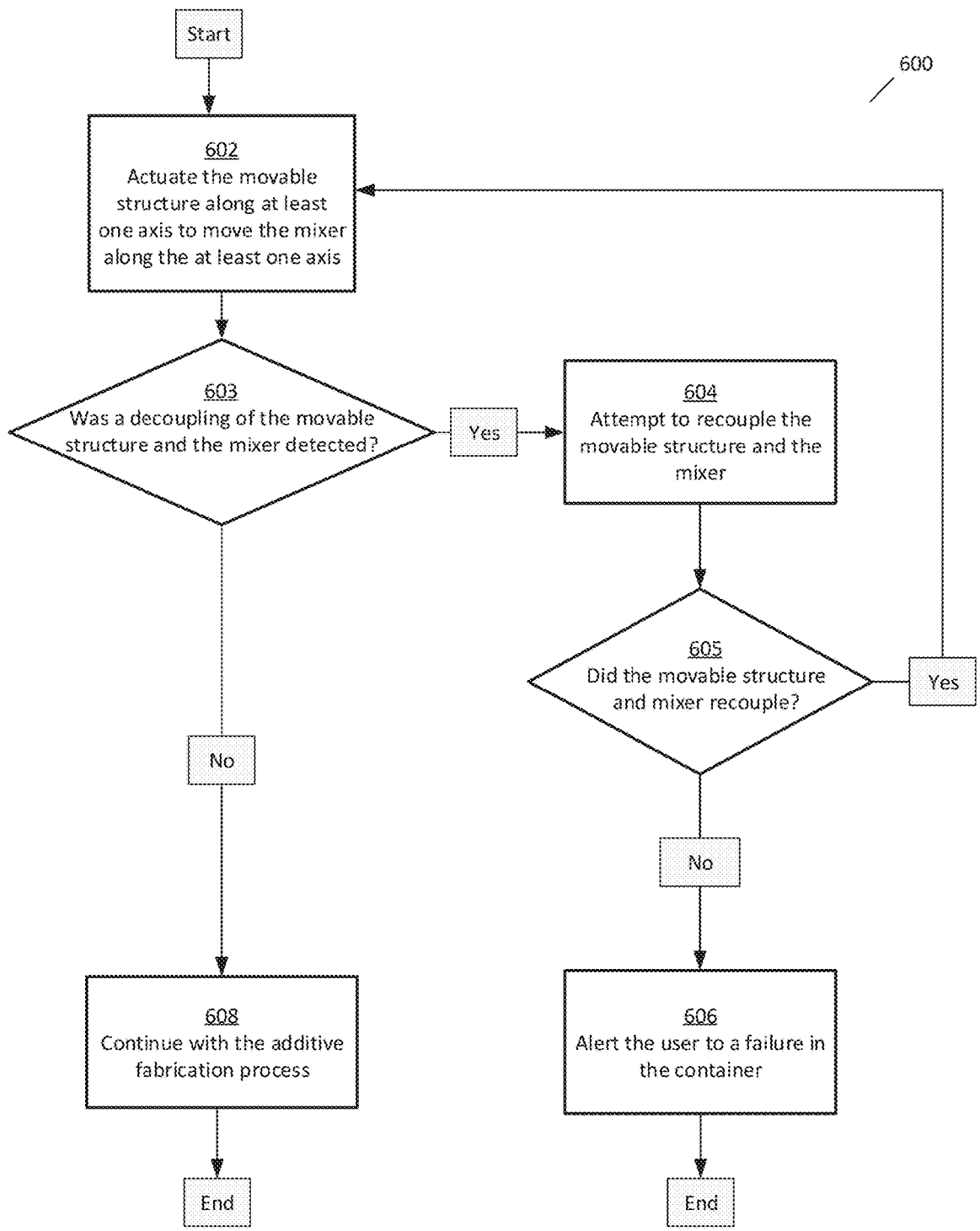
FIG. 6 is a flowchart of a process suitable for detecting and/or removing debris in a container of an additive fabrication device, according to some embodiments.

FIG. 6 is a flowchart of an exemplary process 600 for detecting and addressing failures in the container 106 of an additive fabrication device, according to some embodiments. Process 600 may be run prior to an additive fabrication process, intermittently during an additive fabrication process, or after the formation of each layer of an object. In act 602, whilst the mixer 202 is coupled to the movable structure 206, the movable structure may be actuated along at least one axis to move the mixer along the at least one axis. If sensor 216 does not detect a decoupling of the mixer 202 from the movable structure 206 in act 603, then the additive fabrication device may proceed with next steps of the additive fabrication process in act 608, as no failures in the container have been detected.

If sensor 216 detects a decoupling of the mixer 202 from movable structure 206 in act 603, the additive fabrication device may attempt to recouple the mixer 202 and the movable structure 206 in act 604. In some embodiments, rather than detecting a decoupling of mixer 202 from movable structure 206, sensor 216 may be configured to detect a force on the mixer above a threshold force. If the mixer 202 and the movable structure 206 are successfully recoupled in act 605, the additive fabrication device may return to act 602. If the mixer 202 and the movable structure 206 do not successfully recouple, the additive fabrication device may alert the user to a failure in the container in act 606.

Figure 7:
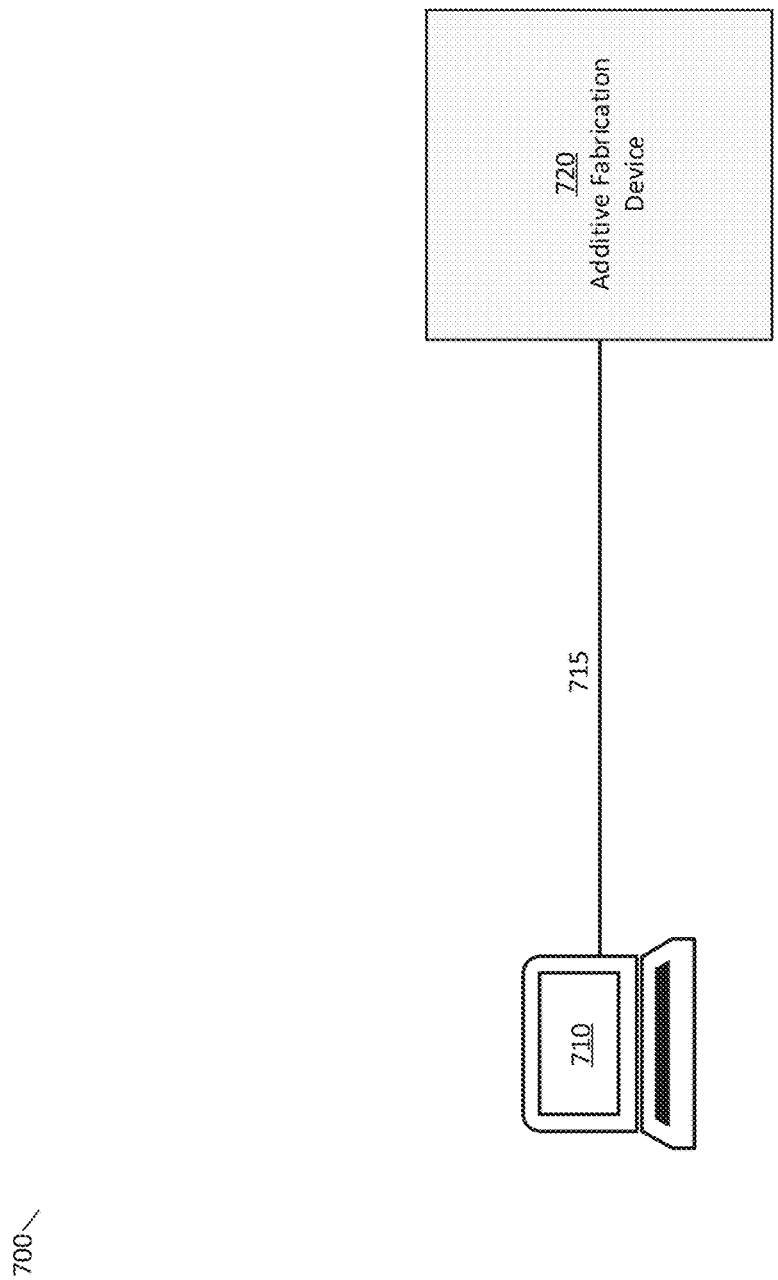
FIG. 7 illustrates an example of a computing system environment on which aspects of the invention may be implemented.

FIG. 7 is a block diagram of a system suitable for practicing aspects of the invention, according to some embodiments. System 700 illustrates a system suitable for generating instructions to perform additive fabrication by an additive fabrication device and subsequent operation of the additive fabrication device to fabricate an object. For instance, instructions to identify contamination on an optical window of an additive fabrication device or detect a failure mode of an additive fabrication process as described by the various techniques above may be generated by the system and provided to the additive fabrication device. Various parameters associated with identifying contamination on an optical window of an additive fabrication device or detecting a failure mode of an additive fabrication process may be stored by system computer system 710 and accessed when generating instructions for the additive fabrication device 720 to identify contamination or detect a failure mode.

According to some embodiments, computer system 710 may execute software that generates instructions for identifying contamination within an additive fabrication device. Said instructions may then be provided to an additive fabrication device, such as additive fabrication device 720, that, when executed by the device, performs a two-dimensional, optical scan of a calibration plate. Such instructions may be communicated via link 715, which may comprise any suitable wired and/or wireless communications connection. In some embodiments, a single housing holds the computing device 710 and additive fabrication device 720 such that the link 715 is an internal link connecting two modules within the housing of system 700.

Figure 8:
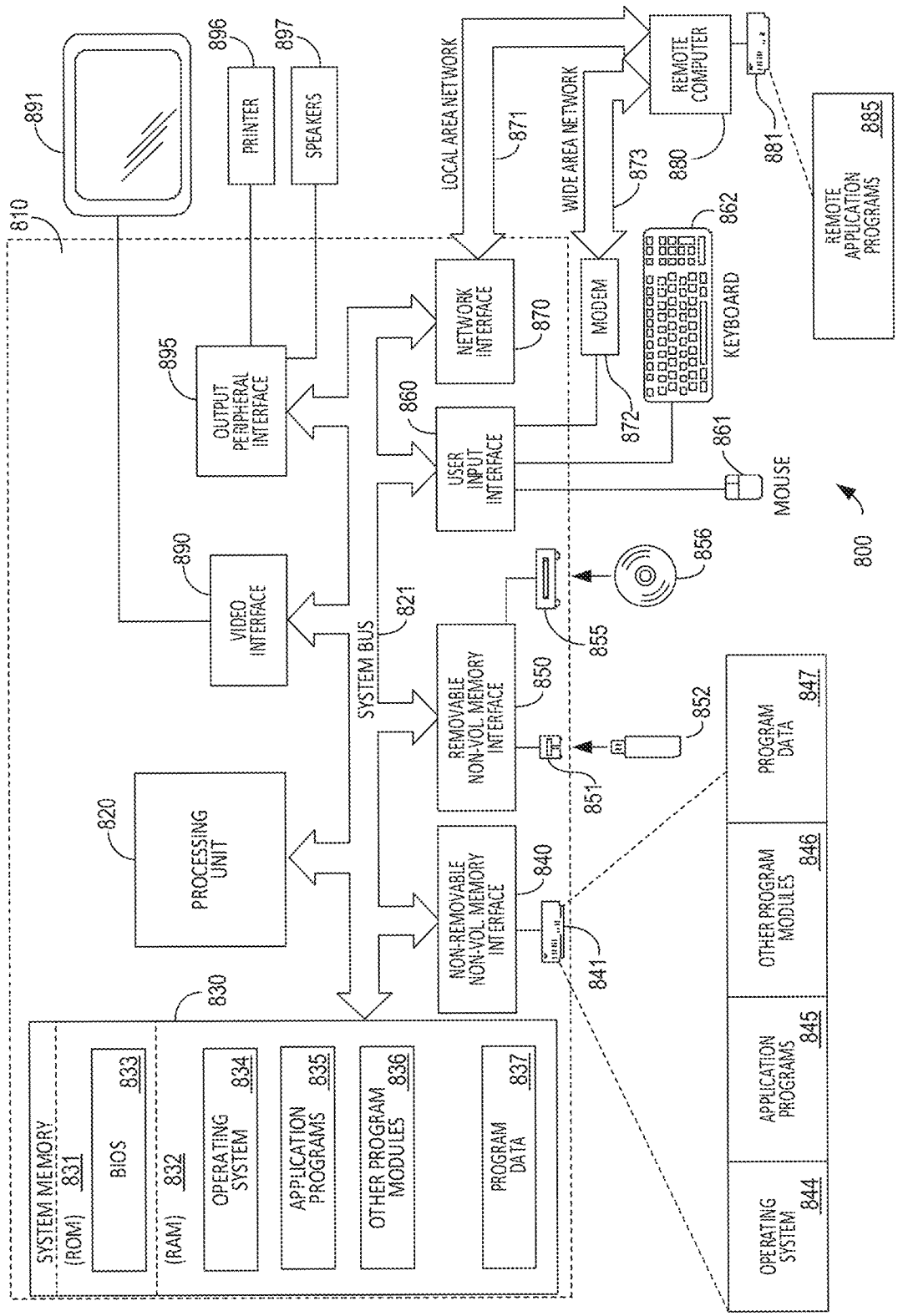
FIG. 8 is a block diagram of a system suitable for practicing aspects of the invention, according to some embodiments.

FIG. 8 illustrates an example of a suitable computing system environment 800 on which the technology described herein may be implemented. For example, computing environment 800 may form some or all of the computer system 710 shown in FIG. 7. The computing system environment 800 is only one example of a suitable computing environment and is not intended to suggest any limitation as to the scope of use or functionality of the technology described herein. Neither should the computing environment 800 be interpreted as having any dependency or requirement relating to any one or combination of components illustrated in the exemplary operating environment 800.

The technology described herein is operational with numerous other general purpose or special purpose computing system environments or configurations. Examples of well-known computing systems, environments, and/or configurations that may be suitable for use with the technology described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The technology described herein may also be practiced in distributed computing environments where tasks are performed by remote processing devices that are linked through a communications network. In a distributed computing environment, program modules may be located in both local and remote computer storage media including memory storage devices.

With reference to FIG. 8, an exemplary system for implementing the technology described herein includes a general purpose computing device in the form of a computer 810. Components of computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 810. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable, volatile/nonvolatile computer storage media. By way of example only, FIG. 8 illustrates a hard disk drive 841 that reads from or writes to non-removable, nonvolatile magnetic media, a flash drive 851 that reads from or writes to a removable, nonvolatile memory 852 such as flash memory, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies. A user may enter commands and information into the computer 810 through input devices such as a keyboard 862 and pointing device 861, commonly referred to as a mouse, trackball or touch pad. Other input devices (not shown) may include a microphone, joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device is also connected to the system bus 921 via an interface, such as a video interface 890. In addition to the monitor, computers may also include other peripheral output devices such as speakers 897 and printer 896, which may be connected through an output peripheral interface 895.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 8. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 8 illustrates remote application programs 885 as residing on memory device 881. It will be appreciated that the network connections shown are exemplary and other means of establishing a communications link between the computers may be used.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. However, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a non-transitory computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software," when used herein, are used in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semi-custom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. An additive fabrication device configured to form layers of solid material on a build platform, the additive fabrication device comprising:
   a container;
   a mixer disposed within the container and configured to move along at least a first axis;
   a sensor configured to produce sensor data indicative of a state of the mixer;
   at least one processor; and
   at least one computer readable medium comprising instructions that, when executed by the at least one processor:
      operate one or more actuators to move the mixer along the first axis; and
      detect a failure of an additive fabrication process based at least in part on the sensor data produced by the sensor during movement of the mixer along the first axis.

2. The additive fabrication device of claim 1, wherein the mixer comprises an elongated body with a first end and a second end and at least one edge member extending along the elongated body from the first end to the second end.

3. The additive fabrication device of claim 2, wherein the at least one edge member is configured to remove debris from a surface proximate to the edge member.

4. The additive fabrication device of claim 3, wherein the at least one edge member is wedge-shaped.

5. The additive fabrication device of claim 3, wherein the instructions, when executed by the at least one processor, further comprise, upon detection of the failure, moving the mixer along the first axis to remove the detected failure.

6. The additive fabrication device of claim 1, wherein the instructions, when executed by the at least one processor, further comprise alerting the user upon detection of the failure.

7. The additive fabrication device of claim 1, wherein the sensor is a force sensor configured to measure forces applied to the mixer.

8. The additive fabrication device of claim 7, wherein the failure comprises material adhered to a surface of the container, and wherein detecting the failure comprises detecting an increase in force measured by the sensor during movement of the mixer along the first axis.

9. The additive fabrication device of claim 1, further comprising a movable structure disposed below the container, the movable structure being coupled to the mixer and the one or more actuators, wherein operating the one or more actuators causes motion of the mixer along the first axis as a result of said coupling to the movable structure.

10. The additive fabrication device of claim 1, wherein the sensor comprises a first sensor and a second sensor, each being configured to produce sensor data indicative of a state of the mixer.

11. An additive fabrication device configured to form layers of solid material on a build platform, the additive fabrication device comprising:
   a build platform;
   a mixer disposed below the build platform and configured to move along a first axis;
   at least one sensor configured to produce sensor data indicative of a state of the mixer;
   at least one processor; and
   at least one computer readable medium comprising instructions that, when executed by the at least one processor:
      lower the build platform iteratively whilst operating one or more actuators to move the mixer along the first axis underneath the build platform until the build platform contacts the mixer; and
      detect a failure of an additive fabrication process based at least in part on the sensor data produced by the sensor during movement of the mixer along the first axis.

12. The additive fabrication device of claim 11, wherein the mixer comprises an elongated body with a first end and a second end and at least one edge member extending along the elongated body from the first end to the second end.

13. The additive fabrication device of claim 12, wherein the at least one edge member is configured to remove debris from a surface proximate to the edge member.

14. The additive fabrication device of claim 13, wherein the at least one edge member is wedge-shaped.

15. The additive fabrication device of claim 11, wherein the instructions, when executed by the at least one processor, further comprise moving the mixer along the first axis while the build platform is in contact with the mixer to remove the detected failure.

16. The additive fabrication device of claim 11, wherein the instructions, when executed by the at least one processor, further comprise alerting the user upon detection of the failure.

17. The additive fabrication device of claim 11, wherein the sensor is a force sensor configured to measure forces applied to the mixer.

18. The additive fabrication device of claim 17, wherein the failure comprises material adhered to the build platform, and wherein detecting the failure comprises detecting an increase in force measured by the sensor during movement of the mixer along the first axis.

19. The additive fabrication device of claim 11, further comprising a movable structure disposed below the container, the movable structure being coupled to the mixer and the one or more actuators, wherein operating the one or more actuators causes motion of the mixer along the first axis as a result of said coupling to the movable structure.

20. The additive fabrication device of claim 1, wherein the sensor comprises a first sensor and a second sensor, each being configured to produce sensor data indicative of a state of the mixer.

* * * * *